Figure 1:
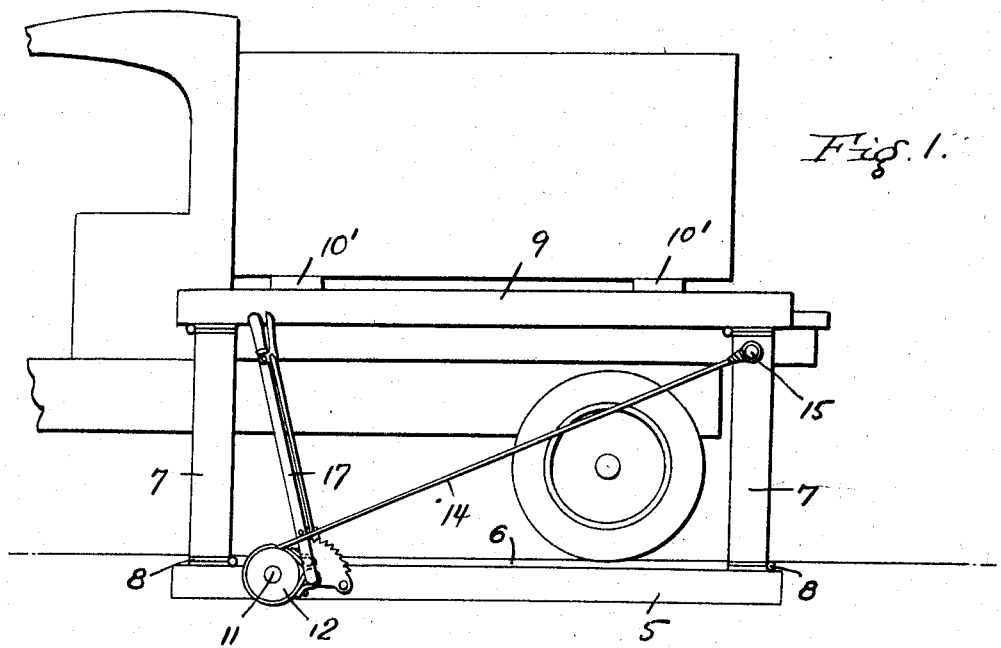

July 7, 1931.  G. GRIMM  1,813,158
LOADING MECHANISM FOR TRUCKS AND OTHER CARRIERS
Filed Jan. 16, 1929  2 Sheets-Sheet 1

Inventor
George Grimm

By Clarence A. O'Brien
Attorney

July 7, 1931.  G. GRIMM  1,813,158
LOADING MECHANISM FOR TRUCKS AND OTHER CARRIERS
Filed Jan. 16, 1929  2 Sheets-Sheet 2

Inventor
George Grimm
By Clarence A. O'Brien
Attorney

Patented July 7, 1931

1,813,158

UNITED STATES PATENT OFFICE

GEORGE GRIMM, OF MENLO, WASHINGTON

LOADING MECHANISM FOR TRUCKS AND OTHER CARRIERS

Application filed January 16, 1929. Serial No. 333,007.

The present invention relates to a loading mechanism and has for its prime object to provide a structure whereby heavy devices, articles, or the like may be loaded on the truck or unloaded therefrom in an expeditious and relatively speedy manner.

Another very important object of the invention resides in the provision of a mechanism of this nature which is comparatively simple in its construction, strong and durable, inexpensive to manufacture, thoroughly efficient and reliable in use and operation, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
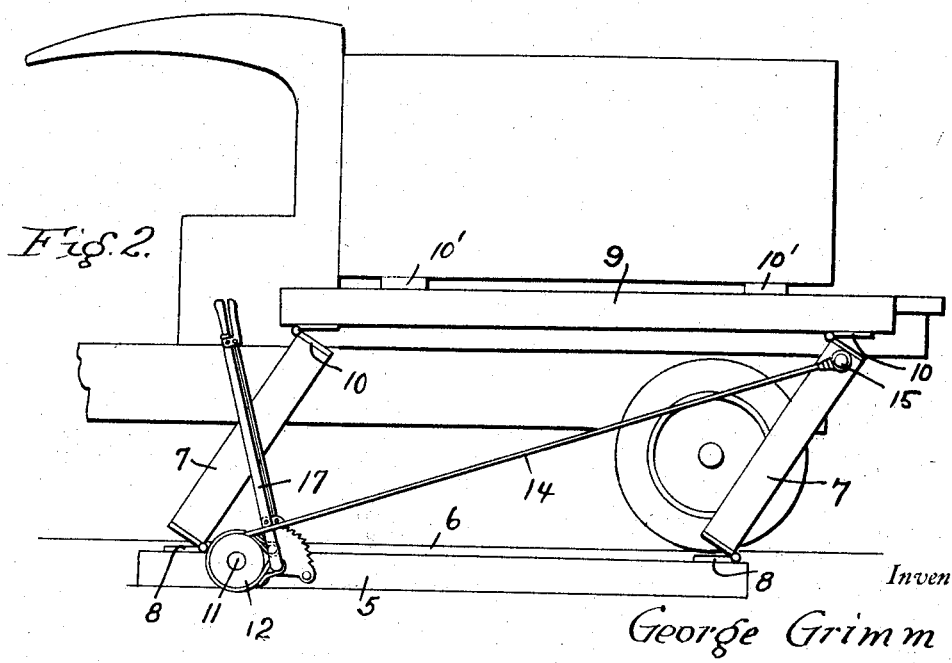
Figure 3:
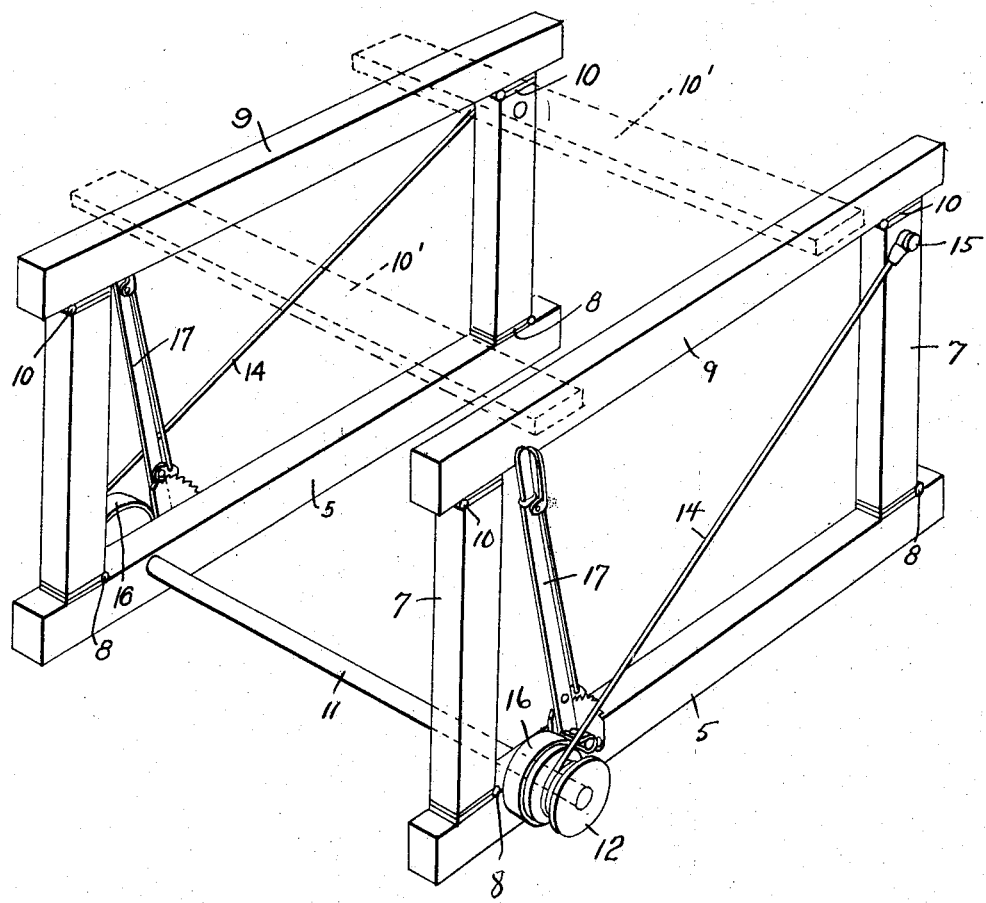

In the drawings:

Figure 1 is a side elevation of the mechanism embodying the features of my invention showing the same in an upright position, Figure 2 is a similar view showing the same in a tilted position, and Figure 3 is a perspective view of the mechanism.

Referring to the drawings in detail it will be seen that the numerals 5 denote two parallel coextensive spaced beams one to each side of a suitable runway 6. Standards 7 are hingedly connected by leaf hinges 8 to the end portions of the beams 5 so that they may be disposed in upright or perpendicular positions with respect thereto or may be swung downwardly and rearwardly all in the same direction.

Beams 9 are hingedly connected by leaf hinges 10 with the upper ends of the standards so as to be always in parallelism with the spaced beams 5 and permit rearward swinging movement of the standards. Suitable cross members 10' may be disposed on the upper beams 9. It will be seen that the arrangement of the leaf hinges 8 and 10 is such that swinging movement of the standards 7 from a vertical position will be permitted only in a rearward direction.

A shaft 11 is journaled between the beams 5 and has drums 12 on its ends about which are wound cables 14 attached to the upper ends of the remote standards 7 as is indicated at 15. Suitable brake mechanisms 16 are associated with the drums 12 and operable by levers 17.

The load having previously been arranged on the loading mechanism, an empty truck backs under the load as is indicated to advantage in Figure 1 and with its backward movement the load is lowered on to the platform of the truck as is indicated in Figure 2.

The apparatus, now minus its load can then be lowered by releasing the brakes or equivalent mechanism 16, just sufficient to give clearance to the structure or platform which now carries the load. The mechanism embodying this loader, of course, may also be used to unload trucks by reversing the steps just described.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, in the sizes, materials and arrangement and combination of parts may be resorted to without departing from the spirit or scope of the invention as hereinafter claimed or sacrificing any of its advantages.

Having thus described my invention, what I claim as new is:

A loading mechanism for trucks and other carriers comprising a pair of spaced parallel, horizontal, coextensive base beams, leaf hinges disposed on the upper sides of the base beams adjacent the ends of said base beams, one of the leaves of each hinge being anchored to the base beams, the other of the leaves of each hinge being free for swinging movement in a vertical plane and adapted for abutting engagement with the first named leaves for limiting the swinging movement of said other leaves in one direction, standards fixed on the swingable leaves for movement therewith, said standards disposed in vertical position when the leaves of the hinges are in opposed, abutting engagement with each other, the hinges constituting means for pivotally connecting the standards to the base beams for swinging movement in one direction only from a vertical position, leaf hinges mounted on the upper ends of the standards and reversely disposed with respect to the first named hinges, one of the leaves of each of the second named hinges being secured to the standards, the other leaves of each of the second named hinges being swingable in a vertical plane and adapted for opposed, abutting engagement with the secured leaves for limiting the movement of said swingable leaves and a pair of spaced, parallel, coextensive beams anchored to the swingable leaves of the second named hinges adjacent their ends and disposed substantially in parallelism with the base beams.

In testimony whereof I affix my signature.

GEORGE GRIMM.